(12) United States Patent
Castel

(10) Patent No.: US 6,877,416 B2
(45) Date of Patent: Apr. 12, 2005

(54) BRAKING FORCE AMPLIFIER WITH DUAL AMPLIFICATION RATIOS FOR MOTOR VEHICLES

(75) Inventor: Philippe Georges Castel, Paris (FR)

(73) Assignee: Delphi Technologies, Inc., Troy, MI (US)

(*) Notice: Subject to any disclaimer, the term of this patent is extended or adjusted under 35 U.S.C. 154(b) by 51 days.

(21) Appl. No.: 10/052,240

(22) Filed: Jan. 17, 2002

(65) Prior Publication Data
US 2002/0135226 A1 Sep. 26, 2002

(30) Foreign Application Priority Data
Jan. 22, 2001 (FR) .............................. 01 00822

(51) Int. Cl.[7] .................................................. F15B 9/10
(52) U.S. Cl. ......................................................... 91/369.2
(58) Field of Search ............................ 91/369.2, 369.3

(56) References Cited

U.S. PATENT DOCUMENTS

| | | | | |
|---|---|---|---|---|
| 4,862,787 A | * | 9/1989 | Suzuki et al. ............... | 91/369.2 |
| 5,012,723 A | * | 5/1991 | Gauthier ..................... | 91/369.2 |
| 5,425,302 A | | 6/1995 | Levrai et al. ............... | 91/369.2 |
| 5,683,147 A | | 11/1997 | Tsubouchi et al. ......... | 91/369.2 |
| 5,794,506 A | * | 8/1998 | Inoue et al. ................ | 91/369.2 |
| 5,884,548 A | | 3/1999 | Ando et al. ................. | 91/369.2 |
| 5,943,937 A | | 8/1999 | Endo .......................... | 91/369.2 |
| 6,192,783 B1 | * | 2/2001 | Tobisawa .................... | 91/369.2 |

FOREIGN PATENT DOCUMENTS

| | | |
|---|---|---|
| JP | 10230841 | 12/1998 |
| JP | 11208456 | 11/1999 |

* cited by examiner

Primary Examiner—F. Daniel Lopez
(74) Attorney, Agent, or Firm—Michael D. Smith

(57) ABSTRACT

This braking force amplifier with dual amplification ratios includes a thrust assembly (71) comprising a reaction rod (82) connected to the master-cylinder of the corresponding brakes and mounted to be axially displaceable under the control of a plunger (22) between a first braking state corresponding to a first ratio of amplification of the braking force, and a second braking state corresponding to a second ratio of amplification of the braking force, and a deformable reaction disc (96) interposed between a piston (70) and the plunger on the one hand, and the reaction rod on the other. The thrust assembly includes means (104) for absorbing the deformations of the reaction disc, the said deformations contributing to determining the braking force for which passage between the first and the second braking states takes place.

18 Claims, 4 Drawing Sheets

BRAKING FORCE AMPLIFIER WITH DUAL AMPLIFICATION RATIOS FOR MOTOR VEHICLES

TECHNICAL FIELD

The present invention relates to braking systems for road vehicles and relates more particularly to a braking force amplifier with dual amplification ratios.

BACKGROUND OF THE INVENTION

Braking systems with dual amplification ratios generally include a master-cylinder intended, when a brake pedal is operated, to subject the brake fluid to an increased pressure transmitted by means of suitable pipes to the brakes of the vehicle so as to operate them. Between the master-cylinder and the brake pedal is interposed a braking force amplifier, able to multiply the force applied by a driver to the brake pedal by a first amplification ratio while this force does not exceed a certain threshold, and then by a second amplification ratio beyond this threshold.

In known manner, a braking force amplifier includes a casing, a diaphragm separating the casing into a front chamber which is provided with means for connection to a vacuum source and a back chamber.

The braking force amplifier also conventionally includes a mobile assembly formed on the one hand by a thrust assembly intended to transmit the amplified force at the output and on the other by a piston intended to communicate to the thrust assembly the additional force generated by a pressure difference between the front chamber and the back chamber. The piston includes a plunger mounted to be axially displaceable within it and able to come to bear against a reaction disc. This plunger transmits the force applied to the brake pedal to the thrust assembly by means of the reaction disc.

The thrust assembly is composed principally of a sleeve, and a push-rod bearing against the piston by means of the reaction disc and mounted to be axially displaceable within the sleeve. The thrust assembly also includes a spring intended to oppose the penetration of the push-rod into the sleeve.

The reaction disc is interposed between on one side a bearing surface of the push-rod and on the other side bearing surfaces of the plunger and of the piston respectively.

Under the influence of an operating rod connected to the brake pedal and receiving the braking force or input force, the plunger and the piston jointly apply a thrust force to the push-rod by means of the reaction disc. The push-rod, under the joint influences of the thrust force and the return force of the spring, is displaced axially in the sleeve of the thrust assembly between a first braking state corresponding to a first ratio of amplification of the input force and a second braking state corresponding to a second ratio of amplification of the input force.

In these known braking force amplifiers, the adjustment of the threshold of the input force F0, for which the passage between the first and the second braking states takes place, is effected by selecting a spring the constant of elasticity of which is more appropriate, which is irksome.

SUMMARY OF THE INVENTION

The present invention therefore aims to correct these disadvantages by creating a braking force amplifier with dual amplification ratios in which the force for which the passage between the first and the second braking states takes place is adjusted in a simpler manner.

The invention therefore has as its object a braking force amplifier with dual amplification ratios including:
- a piston operated by a pressure differential between two chambers;
- a plunger, mounted to be axially displaceable in this piston between positions controlling the evolution of this pressure differential by means of switching means, under the control of a brake pedal;
- a thrust assembly comprising a reaction rod connected to the master-cylinder of the corresponding brakes and mounted to be axially displaceable under the control of the plunger between a first braking state corresponding to a first ratio of amplification of the braking force, and a second braking state corresponding to a second ratio of amplification of the braking force, and a deformable reaction disc interposed between the piston and the plunger on the one hand and the reaction rod on the other, characterised by the fact that the thrust assembly includes means for absorbing the deformations of the reaction disc, the said deformations contributing to determining the braking force for which the passage between the first and the second braking states takes place.

In accordance with other characteristics of a braking force amplifier with dual amplification ratios in accordance with the invention:
- the said deformations are a function of the stiffness of the reaction disc.
- it includes a bearing surface intended to come into contact with a corresponding bearing surface of the thrust assembly, the area of contact between these two surfaces substantially determining the second amplification ratio, and the distance X between these two surfaces, at rest, contributing to determining the braking force for which the passage between the first and the second braking states takes place.
- the said bearing surfaces of the piston and the thrust assembly are annular and co-axial with each other.
- the reaction disc is arranged in a housing formed in a head at the end of the reaction rod, the said housing providing a cavity forming the said means for absorbing the deformations.
- it is suitable to receive an end of the piston and has a dimension greater than that of the said end of the piston so as to provide the cavity for absorbing the deformations of the reaction disc.
- the reaction rod includes at its end a head mounted to be axially displaceable within a sleeve provided with a flange forming on the one hand an orifice in which one end of the piston slides, and on the other a bearing surface, the reaction disc being housed inside the sleeve bearing on one side against the said head and on another side on the said bearing surface of the flange, the said bearing surface of the flange co-operating with the said end of the piston on displacement of this to form the said means for absorbing the deformations of the reaction disc.
- the orifice formed by the flange of the sleeve is circular and by the fact that the end of the piston able to slide in this is cylindrical.
- elastic means are mounted within the sleeve bearing on the one hand on a face of the head of the reaction rod opposite to the reaction disc and on the other on a stop firmly attached to the sleeve to apply a return force to the latter.

the elastic means are formed of a conical washer.

the sleeve includes a shoulder suitable to act as a travel limit stop for the head of the reaction rod in the absence of braking.

the reaction disc is practically incompressible.

the first amplification ratio is practically constant.

the second amplification ratio is practically constant.

BRIEF DESCRIPTION OF THE DRAWINGS

The invention will be better understood on reading the following description, given only by way of example and with reference to the attached drawings in which.

DESCRIPTION OF THE PREFERRED EMBODIMENT

Figure 1:
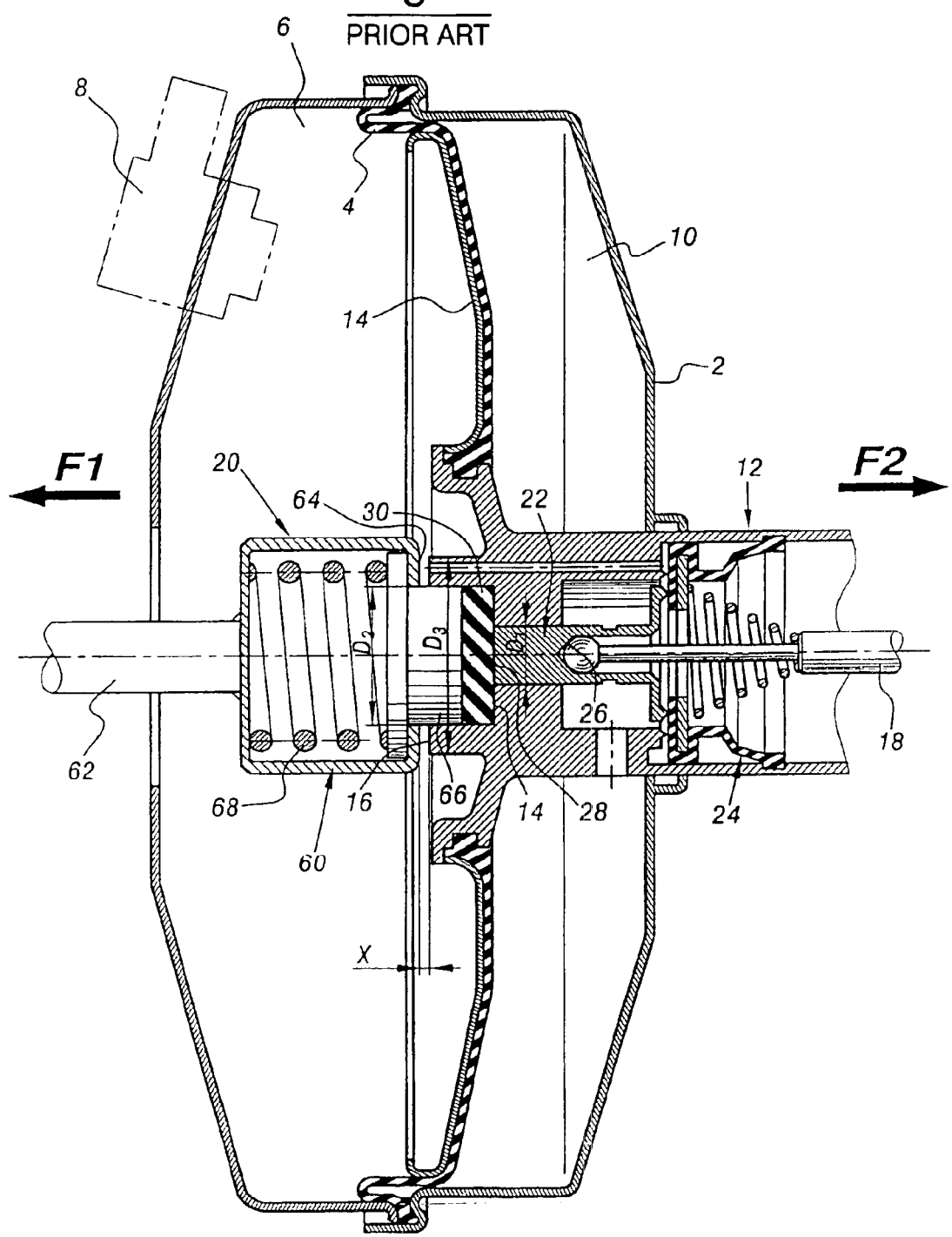
FIG. 1 is a diagrammatic view in longitudinal section of a braking force amplifier with dual amplification ratios in accordance with the prior art.

FIG. 1 shows diagrammatically in longitudinal section a braking force amplifier with dual amplification ratios in accordance with the present state of the art.

It comprises a closed casing 2 in which is arranged a diaphragm 4 defining a front chamber 6 provided with means 8 for connection to a vacuum source (not shown) and a back chamber 10 in which there is a variable pressure. The central part of the diaphragm 4 is mounted on a piston 12 sliding axially in the casing 2 in a direction substantially perpendicular to the general plane of separation of this casing 2 by said diaphragm 4. A diaphragm support 15 having the general shape of a cup is fixed rigidly to the piston 12 and extends radially from this. The piston 12 has first and second annular and co-axial bearing surfaces 14 and 16 turned towards the front of chamber 6. The first bearing surface 14, of diameter $D_2$, is arranged to the rear of the second hearing surface 16, of diameter $D_3$, in the direction of the arrow F1, i.e. in the direction of the front chamber. The advantage of these bearing surfaces will become apparent on reading the remainder of the description.

The two ends of the piston 12 each receive an organ communicating one the input force, and the other that of the output, i.e. respectively an operating assembly arranged on the side of the back chamber 10 and connected to the brake pedal by means of an operating rod 18, and a thrust assembly 20 arranged on the side of the front chamber 6 and connected to the master-cylinder.

The operating assembly comprises a plunger 22 mounted to be axially displaceable in the piston 12 between positions controlling the evolution of the pressure difference between the two chambers 6 and 10 by means of known switching means 24. The plunger 22 is connected by means of a swivel bearing 26 to the control rod 18 which is thus able to operate this plunger 22. The end of the plunger 22 opposite to the operating rod 18 includes a circular bearing surface 28, of diameter D1, intended to be applied to a reaction disc 30. The first annular bearing surface 14 of the piston 12 receives the sliding plunger 22 and is also applied to the reaction disc 30.

The thrust assembly 20 is formed of a blind sleeve 60, the blind end of which, opposite to the piston 12, is connected to the master-cylinder by means of a rod 62. The other end of the sleeve 60 includes an annular bearing surface 64 able to co-operate with the corresponding second bearing surface 16 of the piston 12. A distance X axially separates these two surfaces in FIG. 1. A push-rod 66, mounted to be axially displaceable within the sleeve 60, is pushed back in a direction opposite to the arrow F1 by a spring 68. A circular bearing surface of diameter $D_2$ of the push-rod 66 bears against the reaction disc 30.

The reaction disc 30 is thus interposed between, on the one hand, the bearing surface of the push-rod and, on the other, the bearing surfaces 14 and 28 respectively of the piston 12 and the plunger 22.

In the position of rest or of the absence of braking the operating rod 18, not biased by the brake pedal, is in the withdrawn position, i.e. shifted in a direction opposite to the arrow F1 relative to that which it occupies in FIG. 1.

When an effort is applied to the brake pedal, the operating rod 18 and the plunger 22 are displaced in the direction shown by the arrow F1, i.e. in the direction of the front chamber 6. The switching means 24 then hermetically close the front chamber 6 to keep it under vacuum, and connect the back chamber 10 to the ambient air. The braking force amplifier thus enters a first braking state after a brief transitory phase, here called initial braking surge.

In this state a pressure difference exists between the back chamber 10 and front chamber 6, and the diaphragm 4 is applied to die diaphragm support 15, thus transmitting to the piston 12 a thrust force corresponding to the pressure difference, oriented in the direction of the arrow F1.

This thrust force is transmitted by means of the first bearing surface 14 of the piston 12 and the reaction disc 30 to the push-rod 66, under the control of the plunger 22. Under the influence of this thrust force, the push-rod 66 compresses the spring 68, which, by reaction, applies a thrust force to the blind end of the thrust assembly 20, thus causing its displacement. In this first braking state the distance X is not eliminated and consequently the ratio of amplification of the braking force is substantially equal to the ratio of the circular bearing surface of the push-rod 66 over the bearing surface 28 of the plunger, i.e. to the ratio $$\left(\frac{D_2}{D_1}\right)^2.$$

Progressively as the input force on the brake pedal intensifies, the push-rod 66 penetrates the interior of the sleeve 60 until the second bearing surface 16 of the piston 12 enters into contact with the corresponding surface 64 of the thrust assembly 20. From then on a second braking state is entered into in which the thrust force of the piston 12 is also transmitted to the thrust assembly 20 by the additional bearing surface 16. Consequently, the ratio of amplification of the braking force becomes substantially equal to $$\left(\frac{D_3}{D_1}\right)^2.$$

If the user continues to intensify the braking force, the piston 12 arrives at the end of its travel and the input force is no more amplified.

It is consequently found, on reading the description of the prior state of the art which has just been given, that to adjust the input force for which the passage between the first braking state and the second braking state takes place, it is necessary to act on the constant of elasticity of the spring 68 and on the distance X separating the bearing surface 64 of the thrust assembly 20 from the second bearing surface of the piston 12 at rest. Now, in practice, this adjustment proves to be long and irksome.

Figure 2:
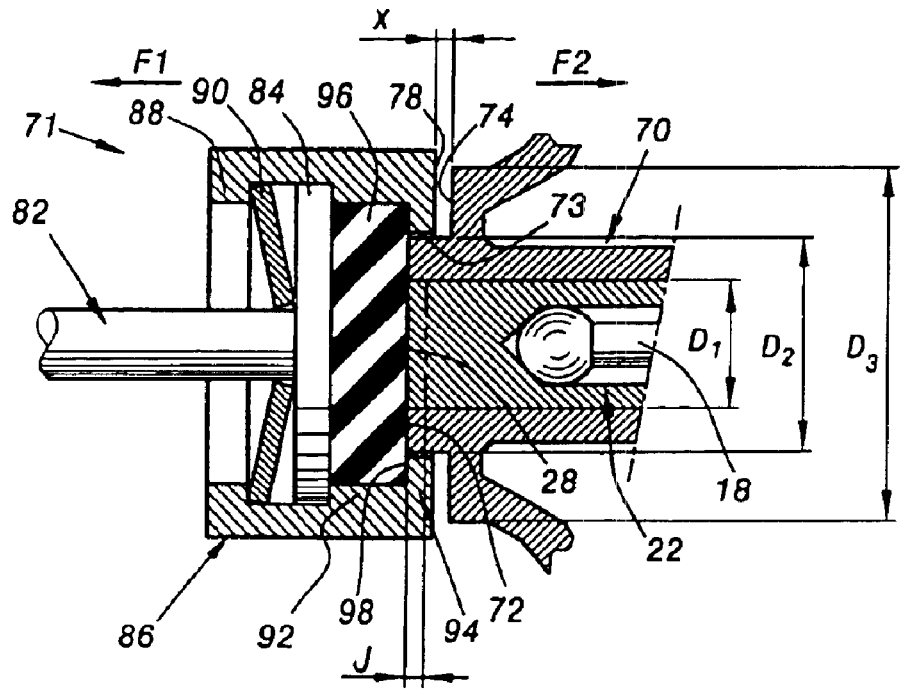
FIG. 2 is a diagrammatic view in longitudinal section of a thrust assembly of a braking force amplifier in accordance with the invention in a first braking state.

In FIG. 2 are shown in a first braking state: a piston 70, a thrust assembly 71 and elements which co-operate with them in accordance with the invention. These elements are intended to be housed in a casing (not shown in this figure) in an identical or similar arrangement to that shown in FIG. 1 and commented on above. The piston 70 includes first and second co-axial annular bearing surfaces 72 and 74. The first bearing surface 72, of diameter $D_2$, is able to penetrate by sliding inside a circular central orifice 73 of one the ends of the thrust assembly 71. The second annular bearing surface 74, of diameter $D_3$, set back from the first bearing surface 72 in the direction shown by the arrow F2, is intended to enter into contact with a corresponding surface 78 of the thrust assembly 71.

The thrust assembly 71 is composed of a reaction rod 82 connected to the master-cylinder, provided with a flat head 84 mounted to be axially displaceable within a sleeve 86.

The end of the sleeve 86, on the side of the reaction rod 82, includes an internal stop 88 intended to receive bearing against it a conical washer 90. This conical washer on the one hand bears against this stop 88 and on the other bears against the flat head 84 of the reaction rod so as to bias this against an internal shoulder 92 of the sleeve 86. The shoulder 92 locates precisely and repeatedly the position at rest or in the absence of braking of this sleeve against the flat head 84 and thus forms a travel limit stop for the head 84.

The other end of the sleeve 86 includes an annular flange 94 provided with the central orifice 73 and externally forming the bearing surface 78. The bearing surface 78 is axially separated from the corresponding bearing surface 74 of the piston 70 by a distance X.

A reaction disc 96, made of a substantially incompressible and deformable material, for example rubber, is interposed between on the one hand an inner surface 98 of the flange 94, and on the other the flat head 84 of the reaction rod.

Figure 4:
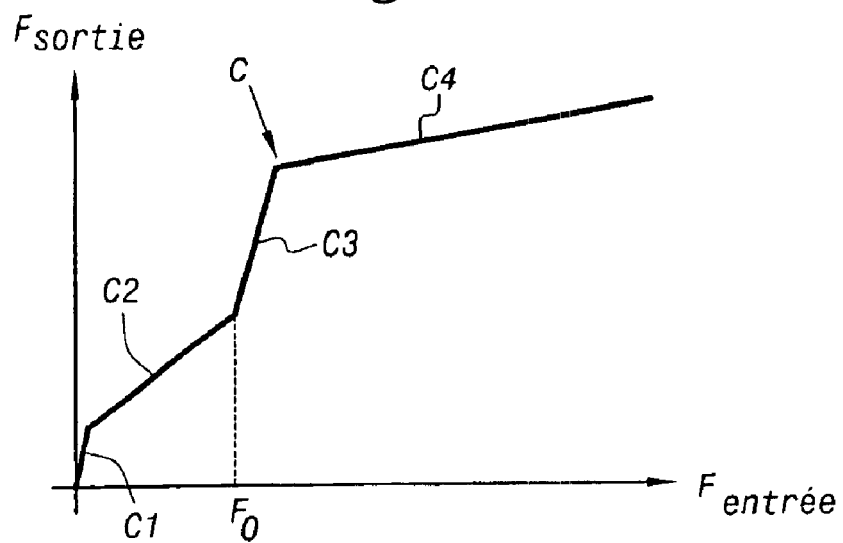
FIG. 4 is a graph showing the force produced at the output of the amplifier of FIG. 2 as a function of the force applied at the input.

The relationship which links the output force to the input force of an amplifier in accordance with FIG. 2 is represented by the curve C traced on the graph of FIG. 4. This curve C only has an illustrative nature, the relative proportions of the portions of which it is composed having been selected arbitrarily, like their gradients, solely with a view to clarity.

Figure 5:
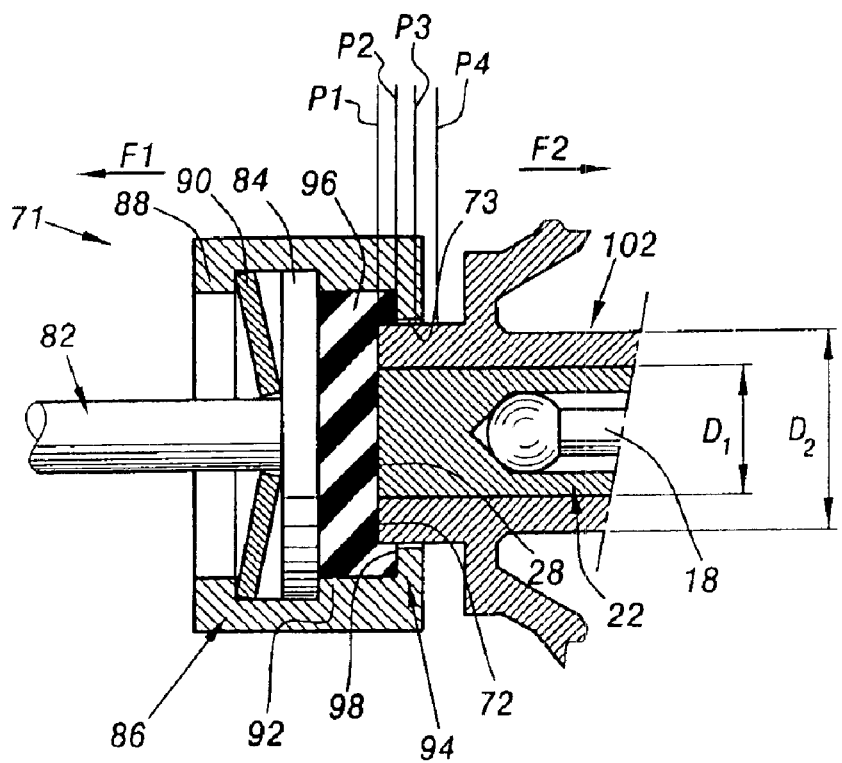
FIG. 5 is a view similar to that of FIG. 4 showing a modified embodiment of the invention.

FIG. 5 shows a view similar to that of FIG. 2 showing a modified embodiment of the invention in which the piston 70 of FIG. 2 is replaced by a piston 102 not including a second bearing surface equivalent to the bearing surface 74 of the piston 70 intended to abut against the thrust assembly 71.

As a modification, the conical washer 90 used in the embodiments of FIG. 2 and FIG. 5 can be replaced by any elastic means permitting a reaction force to be applied to the flat head 84 of the reaction rod 82 in the direction of the arrow F2.

The operation of the braking force amplifier with dual amplification ratios in accordance with the invention will now be described with the aid of FIGS. 2 to 6.

Figure 3:
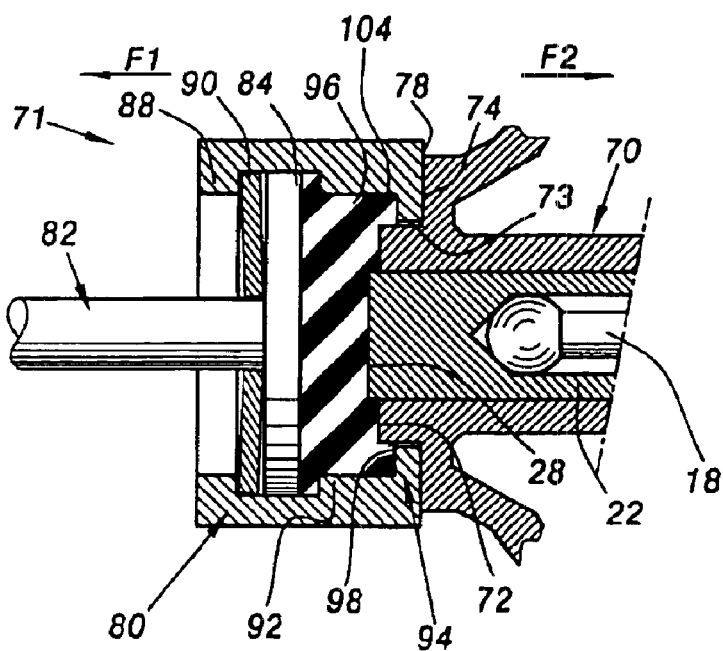
FIG. 3 shows the thrust assembly of FIG. 2 in a second braking state.

Reference is firstly made to FIGS. 2 to 4 describing the invention in accordance with a first embodiment.

In the position of rest or absence of braking, the first bearing surface 72 of the piston 70 is in contact with the reaction disc 96 but applies no thrust force to this. A clearance J, shown in chain-dotted lines in FIG. 2, exists, in known manner, between the bearing surface 28 of the plunger and the reaction disc 96. In a manner similar to FIG. 1, when an input force is applied to the brake pedal, in known manner it produces an initial braking surge connected with the existence of the clearance J. This initial braking surge is represented by the portion C1 of the curve C of FIG. 4.

If the braking force is intensified, the plunger 22 continues its travel until contact with the reaction disc 96. The amplifier is thus in a first braking state in which the first bearing surface 72 of the piston 70 and the surface 28 of the plunger 22 apply a pressure to the reaction disc 96.

This pressure is applied by means of the reaction disc 96 to the inner surface 98 of the sleeve and to the flat head 84 of the reaction rod 82.

The pressure on the inner surface 98 applies a thrust force in the direction of the arrow F2 to the sleeve 86 which is displaced, when this exceeds a threshold, in opposition to the conical washer 90 in the direction F2. This displacement of the sleeve creates inside The sleeve and around the end of the piston 70 an annular cavity 104 (FIG. 3), filled by the material displaced the deformations of the reaction disc 96. It will consequently be understood that progressively as the input force increases the sleeve 86 is displaced towards the piston 70 and that the distance X decreases.

As to the pressure on the flat head 84, this applies a thrust force in the direction of the arrow F1 which is transmitted at the output of the braking force amplifier by the reaction rod 82.

Over this part of the displacement of the sleeve 86 the quantity of energy necessary to deform the reaction disc 96 is negligible and the ratio of amplification of the input force is considered as constant. The ratio of amplification in this first braking state is in practice substantially equal to the ratio $$\left(\frac{D_2}{D_1}\right)^2.$$

We are moving over the portion C2 of the curve C of FIG. 4.

By again increasing the input force, an input force, marked F0 on the graph of FIG. 4, is reached for which the bearing surface 74 of the piston 70 enters into contact with the corresponding bearing surface 78 of the thrust assembly 71 as shown in FIG. 3. We then pass into a second braking state, represented by the portion C3 of the curve C of FIG. 4, in which the amplification ratio is substantially equal to $$\left(\frac{D_3}{D_1}\right)^2.$$

The operation of the amplifier in this second braking state is similar to that described with regard to FIG. 1 when the second bearing surface 32 of FIG. 1 is in contact with the corresponding bearing surface 64 of the thrust assembly 18 and consequently will not be described in more detail. Similarly, the operation of the amplifier when the piston 70 arrives at the limit of its travel, represented by the portion C4 of the curve C of FIG. 4, is similar to that described with regard to FIG. 1 in the same situation and will also not be described in more detail.

Figure 6:
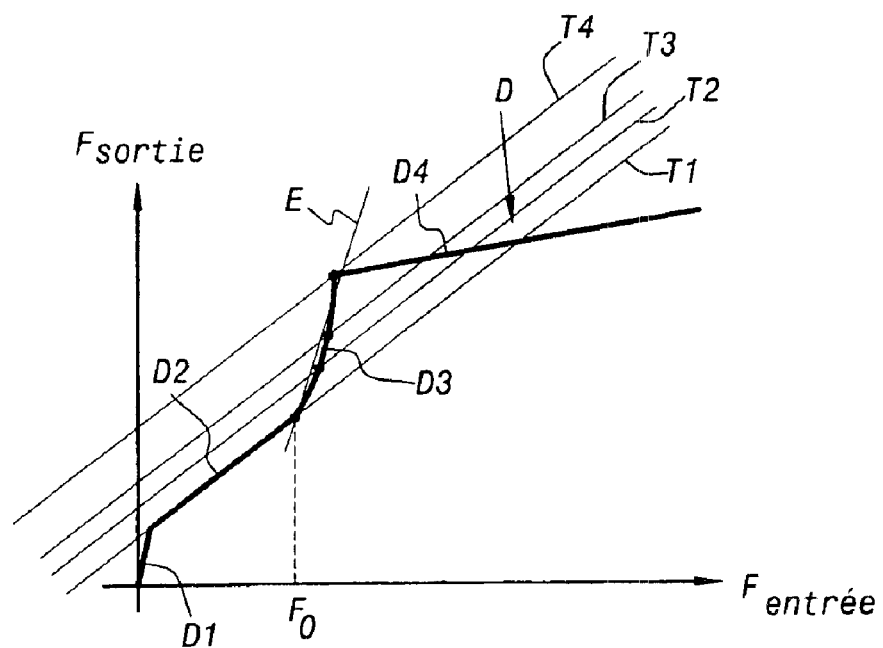
FIG. 6 is a graph showing the force produced at the output of the amplifier of FIG. 5 as a function of the force applied at the input.

The different phases of the operation of the modified embodiment of the braking force amplifier shown in FIG. 5 are illustrated by the evolution of the output force as a function of the input force represented by the curve D of FIG. 6. In a manner similar to the operation of the amplifier of FIG. 2, when an input force is applied to the brake pedal, an initial braking surge is produced, represented by the portion D1 of the curve D.

Then, when the input force is intensified, the internal surface 98 of the sleeve passes successively into different positions, marked P1, P2, P3 and P4 in FIG. 5, P1 and P4 being the ends of the travel of the sleeve. Each position is associated in FIG. 6 with a corresponding straight work line, T1, T2, T3 and T4 respectively. The shift of the straight line on successive passages to positions P1 to P4 results in particular from the increase in the energy required to deform the reaction disc 96 progressively as the input force is intensified.

Thus, at the start of braking and in a similar manner to the embodiment of FIG. 2, the energy necessary to deform the reaction disc 96 is small and the shift of the straight work line can be disregarded. We then move over the portion D2 of the curve D assimilated to a straight line. This corresponds to a first braking state in which the ratio of amplification is substantially equal to $$\left(\frac{D_2}{D_1}\right)^2.$$

Then, for a threshold of the input force, marked F0, the shift of the straight work line can no longer be disregarded and the ratio of amplification increases non-linearly as represented by the portion D3 of the curve D. From there on we enter a second braking state. In this embodiment, the portion D3 can however, as a first approximation, also be assimilated to a straight line E (FIG. 6) having a second ratio of amplification greater than that of the portion D2.

Lastly, this second braking state is followed by a final phase without amplification, represented by the portion D4 of this same FIG. 6, and describable in a similar manner to that of FIGS. 1 and 2.

Figure 7:
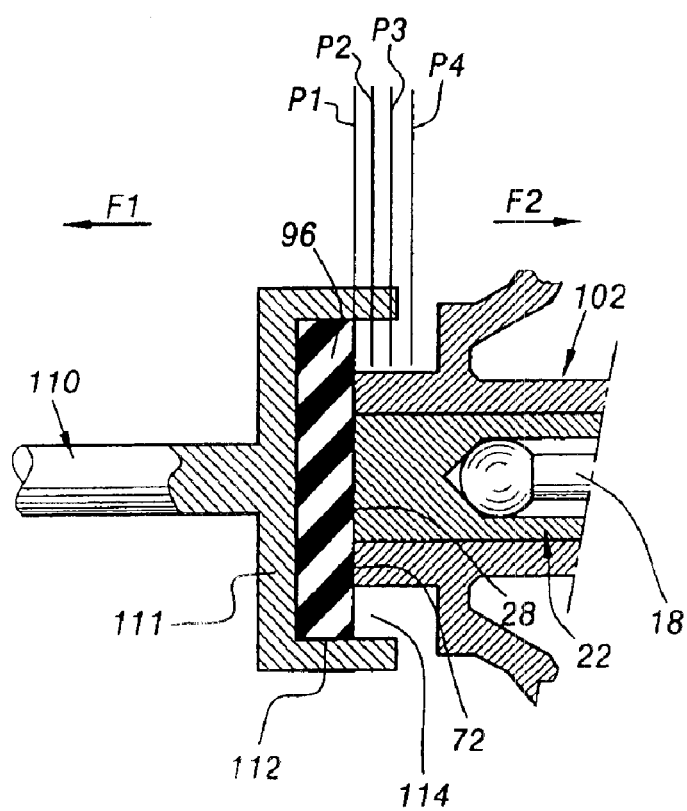
FIG. 7 is a view similar to that of FIG. 4 showing another alternative embodiment of the invention.

In a very simplified embodiment of the invention illustrated in FIG. 7, the thrust assembly 71 of FIG. 5 is replaced by a reaction rod 110 provided at its end with a head 111 provided with a circular housing 112 able to receive the end of the piston 102. The internal diameter of this housing 112 is greater than the diameter $D_2$ of the piston 102 so as to provide a cavity 114 for absorption of the deformations of the reaction disc 96. The reaction disc 96 is arranged at the bottom of the housing 112 and in contact with the bearing surfaces 28, 72 respectively of the plunger 22 and of the piston 102.

The operation of the amplifier of FIG. 7 remains similar to that of FIG. 5. The shift of the straight work line can, at the start of braking, be disregarded and we then move over the portion D2 of the curve D of FIG. 6. Then, if the input force is intensified, the shift of the straight work line is no longer negligible, and we move onto the portion D3 of the curve D.

In the braking force amplifiers with dual amplification ratios in accordance with the invention, the reaction disc 96 absorbs a part of the energy of the input force to be deformed. Consequently, it will be understood on reading the description which has just been given that to shift the threshold F0 of the input force beyond which a braking force amplifier in accordance with the invention passes from a first braking state to a second braking state, it is sufficient to replace the reaction disc with another having a different and more suitable stiffness. It is not therefore necessary, to adjust the threshold F0, to replace the conical washer with another conical washer having a different constant of elasticity or to adjust the distance X when the braking force amplifier is at rest.

The above description is not restrictive, and the invention is easily applied by the man skilled in the art to different modifications, without these being expressly mentioned here.

For example, the amplifier can be of the tandem triple vacuum or pneumatic type, the reaction device simple or double, and the conical washers replaced by parts made of resilient material, for example rubber.

Moreover, the above description clearly identifies two embodiments, with or without second bearing surface 74 on the piston 70. The operational device may function with a second bearing surface on the piston, while having in the phase preceding the stop all the characteristics of the device without the second bearing face described earlier.

What is claimed is:

1. A braking force amplifier with dual amplification ratios comprising:
   a piston operated by a pressure differential between a front chamber and a back chamber, the piston comprising a first piston bearing surface coaxial with a second piston bearing surface;
   a plunger operably attached to a brake pedal and axially displaceable within the piston to control the pressure differential;
   a thrust assembly comprising a reaction rod, operably connected to a master-cylinder and mounted to be axially displaceable under control of the plunger between a first braking state and a second braking state, the reaction rod further including a flat head mounted to be axially displaceable within a sleeve;
   a deformable reaction disc formed of a deformable material and interposed between the piston and the flat head, said reaction disc disposed within the sleeve and held within the sleeve by an annular flange, the flange including a central orifice for receiving the piston and forming a sleeve bearing surface axially separated from the second piston bearing surface when the assembly is in the first braking state and the sleeve bearing surface not axially separated from the second piston bearing surface when the assembly is in the second braking state, and wherein movement of the assembly from the first braking state to the second braking state deforms the reaction disc to cause displacement of the deformable material into the region within the sleeve about the piston.

2. The amplifier of claim 1 further comprising elastic means permitting a reaction force to be applied to the flat head.

3. The amplifier of claim 2 wherein the elastic means is a conical washer.

4. The amplifier of claim 1 wherein the elastic means is between an internal stop of the sleeve on one side of the flat head opposite the reaction disc.

5. The amplifier of claim 1 wherein the deformation is a function of stiffness of the reaction disc.

6. The amplifier of claim 1 wherein the first piston bearing surface and sleeve bearing surface are annular and co-axial.

7. The amplifier of claim 1 wherein the central orifice is circular and the end of the piston able to slide in the central orifice is circular.

8. The amplifier of claim 1 wherein first amplification ratio is constant.

9. The amplifier of claim 1 wherein second amplification ratio is constant.

10. The amplifier of claim 1 wherein the plunger comprises a plunger bearing surface comprising a diameter $D_1$ the first piston bearing surface comprises a diameter $D_2$ and the second piston bearing surface comprises a diameter $D_3$ and the ratio of amplification of the braking force is substantially equal to $(D_2/D_1)^2$ while in the first braking state and the ratio of amplification of the braking force is substantially equal to $(D_3/D_1)^2$ while in the second braking state.

11. The amplifier of claim 10 wherein the transition from the first braking state to the second braking state is nonlinear.

12. A braking force amplifier with dual amplification ratios comprising:

a piston operated by a pressure differential between a front chamber and a back chamber, the piston comprising a first piston bearing surface;

a plunger operably attached to a brake pedal and axially displaceable within the piston to control the pressure differential;

a thrust assembly comprising a reaction rod, operably connected to a master-cylinder and mounted to be axially displaceable under control of the plunger between a first braking state and a second braking state, the reaction rod further including a flat head mounted to be axially displaceable within a sleeve;

a deformable reaction disc formed of a deformable material and interposed between the piston and the flat head, said reaction disc disposed within the sleeve and held within the sleeve by an annular flange, the flange including a central orifice and forming a sleeve bearing surface, and wherein movement of the assembly from the first braking state to the second braking state deforms the reaction disc, to cause displacement of the deformable material into a region within the sleeve about the piston, and elastic means permitting a reaction force to be applied to the flat head in response to deformation of the deformable reaction disc, wherein the elastic means is between an internal stop of the sleeve on one side of the flat head opposite the reaction disc.

13. The amplifier of claim 12 wherein the elastic means is a conical washer.

14. The amplifier of claim 12 wherein the deformation is a function of stiffness of the reaction disc.

15. The amplifier of claim 12 wherein the first piston bearing surface and sleeve bearing surface are annular and co-axial.

16. The amplifier of claim 12 wherein the central orifice is circular and the end of the piston able to slide in the central orifice is circular.

17. The amplifier of claim 12 wherein the first amplification ratio is constant.

18. The amplifier of claim 12 wherein the second amplification ratio is constant.

* * * * *